000
United States Patent [19]

Park

[11] 4,020,267

[45] Apr. 26, 1977

[54] REMOVAL OF RESIDUAL MONOMER IN THE PRESENCE OF WATER BY DIELECTRIC HEATING

[75] Inventor: Anthony John Park, South Croydon, England

[73] Assignee: The British Petroleum Company Limited, London, England

[22] Filed: Dec. 11, 1975

[21] Appl. No.: 639,968

[30] Foreign Application Priority Data

Dec. 16, 1974  United Kingdom ............. 54156/74
Apr. 30, 1975  United Kingdom ............. 17967/75

[52] U.S. Cl. ............................. 528/503; 528/490; 528/491; 528/492
[51] Int. Cl.² ......................................... C08F 6/00
[58] Field of Search ................................... 528/503

[56] References Cited

UNITED STATES PATENTS

| 3,652,752 | 3/1972 | Rosenthal ......................... 264/117 |
| 3,771,234 | 11/1973 | Forster et al. ............................ 34/1 |

FOREIGN PATENTS OR APPLICATIONS

| 1,598,055 | 6/1970 | France ............................... 528/503 |
| 1,226,988 | 3/1971 | United Kingdom ............... 528/503 |
| 1,277,609 | 6/1972 | United Kingdom ............... 528/503 |

*Primary Examiner*—Stanford M. Levin
*Attorney, Agent, or Firm*—Brooks Haidt Haffner & Delahunty

[57] ABSTRACT

Residual vinyl halide is removed from vinyl halide polymer by radiofrequency dielectric heating while maintaining the presence of water in the polymer by impeding evaporation of water from the polymer.

15 Claims, No Drawings

REMOVAL OF RESIDUAL MONOMER IN THE PRESENCE OF WATER BY DIELECTRIC HEATING

The present invention relates to a process for the reduction of the vinyl halide content of vinyl halide polymers.

Vinyl halide polymers are produced in particulate form by a variety of polymerisation processes, namely aqueous emulsion, aqueous microsuspension, aqueous suspension, and mass (or bulk) polymerisation. Vinyl halide polymers absorb vinyl halide monomers. Thus polyvinyl chloride can absorb up to 30% by weight of vinyl chloride. Vinyl halide polymer particles produced during polymerisation will contain absorbed vinyl halide monomer, and although most of the absorbed monomer is removed as polymerisation proceeds, there is normally a residue left in the polymer. Recent discoveries have suggested that vinyl chloride monomer may cause the rare liver cancer angiosarcoma. It is therefore highly desirable to reduce the level of residual vinyl halide, and especially vinyl chloride, in vinyl halide polymer to the lowest possible value. It is especially important to find a method of reducing the vinyl halide content of particulate polymer such as that produced by the various polymerisation processes so that the amount of vinyl halide monomer released in subsequent forming operations such as moulding or extrusion, and the amount of vinyl halide remaining in the finished product, is kept as small as possible.

It is disclosed in GB 1 226 988 that volatile polar liquids can be removed from polymers, by conveying the polymer through a microwave resonating cavity in which it is subjected to microwave radiation. The process may be used to reduce the water content of vinyl chloride. It is clear that the object of the process of GB 1 226 988 is to obtain the maximum removal of all volatile materials from the polymer and there is therefore no suggestion that any attempt should be made to restrict evaporation from the polymer. Similar processes are described in GB 1 277 609 and U.S. Pat. No. 3,771,234.

French Patent Specification 1 598 055 discloses a process for the microwave heating of fibres of polyvinyl chloride in which the fibres are impregnated with water and the pressure is adjusted so that the temperature reached by the fibre corresponds to the boiling point of water under the pressure applied. Thus by using subatmospheric pressure the maximum temperature reached by the fibre is kept below 100° C. The French patent specification refers to eliminating the vapours produced so as to maintain the initially selected pressure. There is no reference to the removal of vinyl chloride and nothing which would lead the man skilled in the art to doubt that the way to remove vinyl halide from vinyl halide polymer is to obtain the most rapid and complete evaporation of all the volatile materials contained in the polymer.

It is also known to use radio frequency heating to prepare cured and gelled articles from polyvinyl chloride pastes (which are mixtures of polyvinyl chloride and plasticizer) or from foamed rubber latices. The radio frequency gelling of polyvinyl chloride paste to give a finished product, namely belting, is disclosed in U.S. Pat. No. 2,639,190. The radiofrequency heating of foamed rubber latices in moulds is disclosed in U.S. Pat. Nos. 2,604,665, 2,604,666, 3,737,488 discloses microwave heating of foamed rubber latex in a closed mould to give a cured product; the latex may contain a reinforcement of polyvinyl chloride.

Process for the production of cured or gelled products from polymers are in no way relevant to the treatment of particulate polymer recovered from a polymerisation process to reduce the amount of volatile liquid in the polymer particles. The present invention is not concerned with the use of radiofrequency energy to produce a cured or gelled product (polyvinyl chloride particles will only form a fused product on heating if they are softened by plasticizer or are subjected to considerable mechanical work for example in an extruder), but with a treatment of polyvinyl chloride particles from which particles are recovered, such as that described in GB 1 226 988. However it has now been found that when vinyl halide is to be removed from polyvinyl halide the best results are not obtained by following the teaching of such patents as GB 1 226 988 to remove the maximum amount of volatile material.

According to the present invention the process for reducing the vinyl halide content of a particulate vinyl halide polymer comprises subjecting the polymer to a radiofrequency dielectric heating step to remove vinyl halide while maintaining the presence of water in the polymer, and recovering particulate polymer from the radiofrequency dielectric heating step.

If vinyl halide polymer, exposed to the atmosphere, is subjected to radio frequency dielectric heating the water present in the polymer will evaporate off leading to a drying of the polymer. It has now been found, however, that it is desirable, if the object is to reduce the vinyl halide content of vinyl halide monomer, to impede the evaporation of water present.

The vinyl halide polymer and monomer from which it is prepared may contain up to 30% by weight of copolymerised or copolymerisable monomer. Examples of copolymerisable monomers are ethylene, propylene, vinyl acetate, vinyl laurate, vinyl stearate and vinylidene chloride. The present invention is particularly applicable to homopolymers of vinyl chloride and copolymers of vinyl chloride with less than 20% by weight of other copolymerisable materials and particularly vinyl acetate. The mixture of vinyl halide polymer and vinyl halide monomer preferably comprises a vinyl halide polymer with residual monomer absorbed during polymerisation. Typically the quantity of monomer will not exceed 30,000 ppm. by weight of polymer, although larger amounts may be present. The process of the present invention may be applied to polymer containing not more than 10,000 ppm. of monomer.

The polymer treated in accordance with the present invention is in particulate form. The present invention is preferably applied to polymer in the particulate form in which it is recovered from the polymerisation process in which it is formed e.g. in the form of beads in the case of suspension polymerisation. It is possible to produce particulate vinyl halide polymer compound i.e. polymer containing the heat stabilizers, lubricants or other additives needed to give a product suitable for forming into a finished article, and the present invention may be applied to vinyl halide compound in particulate form provided that the particles contain nothing which would cause them to fuse together under the radio frequency heating conditions employed so as to prevent the recovery of the polymer in particulate form. It is preferred however to apply the process to vinyl halide polymer resin, that is polymer which does not contain the additives required to give a product which can be formed into final products. These additives may be incorporated in the resin in a subsequent mixing step and the application of the process of the present invention to the resin reduces the amount of vinyl halide monomer likely to be liberated during the subsequent mixing step.

The polymer subjected to the process of the present invention may be wet polymer recovered from a polymerisation carried out in an aqueous medium; alternatively it may be a dry polymer to which water has been added. Preferably the polymer contains, at the beginning of the dielectric heating, at least 1% by weight of water, more particularly at least 5% by weight of water based on weight of dry polymer. Polymer treated in the process of the present invention will commonly contain from 10 to 20% by weight of water but may contain more e.g. up to 30% by weight based on weight of dry polymer. Polymer produced by suspension polymerisation preferably contains at least 15% by weight, and polymer produced by mass polymerisation preferably contains at least 20% by weight of water, at the beginning of the dielectric heating.

In the process of the present invention the polymer is subjected to radio frequency dielectric heating to remove vinyl chloride while maintaining the presence of water in the polymer. It is not sufficient to satisfy this criterion merely to use a quantity of water such that there is water present at the end of the micro wave treatment if the water is allowed to evaporate freely from the polymer in the way that it would be allowed to evaporate if the object is to dry the polymer. The presence of water in the polymer is maintained by impeding the evaporation of water from the polymer. It is preferred to prevent the evaporation of more than 30%, more preferably 20% by weight of the water present in the polymer at the beginning of the dielectric heating, more preferably to prevent the evaporation of more than 10% by weight of water. Most desirably less than 5% by weight of the water present in the polymer at the beginning of the dielectric heating is allowed to evaporate. The removal of vinyl chloride may be achieved by heating the polymer in a vessel which has a restricted opening such that vinyl chloride can escape but sufficient to maintain the presence of water in the polymer.

The polymer may be subjected to dielectric heating in a vessel having a gas space which is large relative to the volume of polymer fed to the vessel, and which vessel does not allow any substantial quantity of vapour to escape from the vessel. When the polymer in the container is subject to dielectric heating both vinyl chloride and water will evaporate into the gas space so reducing the quantities in the polymer. If the quantity of water is large in relation to the quantity of vinyl chloride the gas space will become saturated with vinyl chloride and water without any substantial reduction in the total quantity of water remaining in the polymer, while still obtaining a useful reduction in vinyl chloride content.

In the methods described above the maintenance of the presence of water while removing vinyl chloride requires an initial high weight ratio of water to vinyl chloride in the polymer fed to the dielectric heating, for example at least 10:1, preferably at least 30:1, more preferably at least 100:1, for example at least 1000:1.

When the polymer has been subjected to sufficient radio frequency dielectric heating in the vessel in which the presence of water is maintained to give the desired reduction in vinyl halide content, the polymer may be removed from the vessel and subjected to heating in a separate drying oven, which may be of a conventional non-radio frequency type, to remove the water. Alternatively the polymer may be allowed to remain in the vessel while subjected to radio frequency dielectric heating, the water vapour produced during the treatment by dielectric heating being removed from the vessel either by opening it to atmosphere or by pumping out the vapour from the vessel. Thus the pressure within the vessel may be maintained at a pressure below atmospheric pressure to ensure maximum removal of water.

If the vessel containing the polymer is subjected to an external radio frequency field it must of course be at least partially transparent to the field. Alternatively, the source of dielectric heating may be located within a suitable vessel and the wet polymer caused to pass through the radio frequency field, while controlling the loss of water from within the vessel so that water is maintained in the polymer.

Exposure to radio frequency dielectric heating may be carried out in batch or continuous fashion. To avoid overheating it is preferable to carry out the exposure continuously either by passing the polymer through the treatment area in a layer (e.g. of polymer beads supported on a belt), or to blow polymer particles through the treatment area.

The exposure time may be for periods of 0.1 seconds or less up to 100 minutes, but preferably lies in the range 1 second to 10 minutes. The exposure time is preferably chosen to ensure that with the applied power used, the polymer being treated reaches a temperature in the range 70° to 120° C, preferably 70° to 100° C. At higher temperatures the polymer tends to be degraded.

The radio frequency dielectric heating employed in the process of the present invention is well-known to those skilled in the art of electric heating. Dielectric heating is a method of heating poor electrical conductors by subjecting them to an alternating voltage. The electrical power transferred to the material as heat is a function of frequency, the potential across the material and the dielectric properties of the material. In low frequency dielectric heating the material to be heated is placed between electrodes across which an alternating voltage is applied.

The voltage applied is controlled so as not to exceed the breakdown voltage of the material to be heated. The frequencies used for low frequency dielectric heating are typically in the range 1 to 150 MHz, for example 20 to 100 MHz. Although higher frequencies can be used in dielectric heating between electrodes the electrodes need to be smaller to avoid high capacitance between the electrodes leading to excessive damping of the alternating voltage, and radiation of stray electromagnetic radiation is increased.

Microwave heating is a special case of radio frequency dielectric heating. In microwave heating the required alternating voltage is provided by the electrical component of microwave electromagnetic radiation to which the material to be treated is subjected within an enclosure of conducting material. The material to be treated may be placed inside a resonant cavity in which a standing microwave field is produced or in a wave guide along which microwave electromagnetic radiation is passed. The design and operation of microwave ovens is well understood by those skilled in the art.

The frequency of the microwaves radiation suitably lies in the range 900 to 30,000 MHz. The intensity of irradiation as well as the time is preferably chosen to give a polymer treatment, temperature in the range 70° to 120° C, more preferably 70° to 100° C.

Suitably the process of the present invention is operated with exposure times and applied power radiation intensities so that there are less than 50 ppm vinyl halide monomer in the polymer at the end of the dielectric heating, preferably less than 25 ppm. and most preferably to less than 1 ppm e.g. less 0.5 ppm.

It is believed that a greater reduction of vinyl halide content may be obtained if the polymer contains free radical initiator.

Accordingly another aspect of the present invention provides a process for the polymerisation of vinyl halide monomers, which process comprises subjecting a vinyl halide monomeric material to radio frequency dielectric heating in the presence of added free radical initiator, while maintaining the presence of water.

Examples of suitable initiators are ammonium persulphate, caprylyl peroxide, lauroyl peroxide, benzoyl peroxide, dicyclohexyl peroxy dicarbonate and azobis isobutyronitrile.

Preferably the process is applied to vinyl halide polymers containing residual monomer and initiator to reduce the monomer content.

The quantity of residual free radical initiator may for example be 0.01 to 0.3% by weight of dry polymer.

When treating vinyl halide containing polymers having residual vinyl halide containing monomer additional free radical initiator may be added to assist monomer removal, as disclosed in our copending application Ser. No. 574,396 (Case 3745) corresponding to U.K. patent application 22254/74. Conventional free radical initiators used in vinyl halide polymerisation may be used. Preferably the initiator used is the same as the initiator used to produce the vinyl halide-containing polymer.

The invention will now be further illustrated by reference to the following Examples. The polymer used in these experiments was resin polymer i.e. polymer in particulate form which had not been compounded with the usual ingredients e.g. stabilizers, plasticizers, lubricants, which are used to make PVC compositions suitable for fabrication.

EXAMPLE 1

A sample of vinyl chloride homopolymer in bead form prepared by suspension polymerisation was introduced into a 200 ml glass tube which was stoppered. The polymer was wet polymer obtained by centrifuging the total polymerisation product and contained between 15% and 20% water based on weight of dry polymer. The weight of sample used was 50g. The amount of air space left in the tube was approximately 120 ml. The tube containing the polymer was subjected to microwave radiation for 20 minutes at a frequency of 2450 MHz, in an English Electric PHU15 microwave oven the power applied being about 200W. The stopper of the tube was not sufficiently tight to allow any substantial build up of pressure in the tube on heating, but substantially restricted the evaporation of water from the tube. The vinyl chloride in the polymer was then measured. The experiment was repeated twice and the average result is given in Table 1.

Comparative Test A

In a comparative Example not according to the invention Example 1 was repeated with a sample of the same wet polymer except that the glass tube was open when the polymer was subjected to the microwave radiation. The experiment was repeated twice and the average result is shown in Table 1.

Comparative Test B

A sample of the same wet resin that was used in Example 1 was heated in an air oven up to 70° C for 20 minutes in an open glass tube. The average result of two experiments is shown in the Table 1. This was considered to give an equivalent amount of heating to that given in the microwave oven.

Comparative Test C

Two experiments were carried out as in Example B but with the tube stoppered. The results are shown in Table 1 and show that as would be expected, but contrary to what is found with microwave treatment, there is less reduction in vinyl halide content when a stoppered tube is heated in an air oven.

Comparative Test D

In a control experiment the vinyl halide content of wet polymer direct from the centrifuge was determined. The result is shown in Table 1.

TABLE 1

| Experiment 1 | Vinyl Chloride Content % on dry polymer |
| --- | --- |
| 1 | 0.12 |
| A | 0.55 |
| B | 0.55 |
| C | 0.93 |
| D | 2.25 |

EXAMPLE 2

Two experiments were carried out on a sample of commercial vinyl chloride/vinyl acetate suspension copolymer in the form of wet cake from the centrifuge used to recover the polymer. The polymer contained 14% wt. water based on weight of dry polymer was heated in a microwave oven in a stoppered glass tube for 15 minutes. The microwave oven was a GEC-Elliott Automation EE 3352. The power applied was reduced below the maximum possible to about 300 watts. The vinyl chloride content in the polymer after treatment as the average of two successive determinations is given in Table 2.

Comparative Test E

Experiments were carried out as in Example 3 but with the tube open. The results are given in Table 2.

Comparative Test F

The vinyl halide and vinyl acetate contents of the wet polymer used in Example 3 were determined and are shown in Table 2.

TABLE 2

| Example | Vinyl Halide Content % wt. on dry Polymer | Vinyl Acetate Content % wt. on dry Polymer |
| --- | --- | --- |
| 2 | 0.0002 | 0.16 |
| E | 0.003 | 0.9 |
| F | 0.006 | 1.0 |

EXAMPLE 3

A sample of a vinyl chloride homopolymer in bead form prepared by mass polymerisation was treated with 10% by weight of water based on weight of dry polymer and heated in a stoppered glass tube in the same microwave oven and under the same conditions as were used in Example 2. The vinyl halide content of the treated polymer was 0.11% weight by weight of dry polymer.

Comparative Test G

An experiment was carried out as in Example 3 but with the polymer in an open tube. The resulting vinyl halide content was 0.22% weight based on weight of dry polymer.

I claim:

1. A process for reducing the residual vinyl halide monomer content of a particulate vinyl halide polymer containing at least 1% by weight of water based on the weight of dry polymer which comprises subjecting the polymer to a radiofrequency dielectric heating step to remove vinyl halide while maintaining the presence of water in the polymer so that not more than 30% by weight of the water present at the beginning of the dielectric heating evaporates during the dielectric heating, and recovering particulate polymer from the radiofrequency dielectric heating step.

2. The process according to claim 1 wherein any copolymerised monomer constitutes not more than 30% by weight of the polymer.

3. The process according to claim 2 wherein the polymer is vinyl halide polymer resin.

4. The process according to claim 3 wherein the vinyl halide polymer subjected to radiofrequency dielectric heating is in the particulate form in which it is recovered from the polymerisation process in which it was produced.

5. The process according to claim 4 wherein the polymer subjected to radio frequency dielectric heating is in the form of beads recovered from suspension polymerisation.

6. The process according to claim 1 wherein the polymer contains at least 5% by weight of water, based on weight of dry polymer.

7. The process according to claim 6 wherein the polymer contains at least 20% by weight of water, based on weight of dry polymer.

8. The process according to claim 7 wherein the polymer contains up to 30% by weight of water, based on weight of dry polymer.

9. The process according to claim 1 wherein the evaporation of water is restricted such that not more than 20% by weight of the water present in the polymer at the beginning of the dielectric heating evaporates during the dielectric heating.

10. The process according to claim 9 wherein the evaporation of water is restricted such that not more than 10% by weight of the water evaporates.

11. The process according to claim 1 wherein the weight ratio of water to residual vinyl chloride monomer in the polymer fed to the dielectric heating is at least 10:1.

12. The process according to claim 11 wherein the weight ratio is at least 30:1.

13. The process according to claim 1 wherein the radiofrequency dielectric heating step is carried out using microwave radiation at a frequency in the range 900 to 30,000 MHz.

14. The process according to claim 13 wherein the radiofrequency heating step is carried out for a time sufficient to give a polymer temperature of 70° C to 100° C.

15. The process according to claim 14 wherein the applied power and time are selected so that the polymer contains less than 1 ppm of vinyl halide at the end of the treatment.

* * * * *